United States Patent
Lee et al.

(10) Patent No.: US 9,431,899 B2
(45) Date of Patent: Aug. 30, 2016

(54) POWER SUPPLY DEVICE FOR SUPPLYING STANDBY VOLTAGE BY USING MAIN VOLTAGE

(71) Applicants: SAMSUNG ELECTRO-MECHANICS CO., LTD., Suwon (KR); SOLUM CO., LTD., Suwon-Si (KR)

(72) Inventors: Jeong Nam Lee, Suwon (KR); Chong Eun Kim, Suwon (KR)

(73) Assignees: SAMSUNG ELECTRO-MECHANICS CO., LTD., Suwon-si (KR); SOLUM CO., LTD., Suwon-si (KR)

( * ) Notice: Subject to any disclaimer, the term of this patent is extended or adjusted under 35 U.S.C. 154(b) by 141 days.

(21) Appl. No.: 14/301,803

(22) Filed: Jun. 11, 2014

(65) Prior Publication Data

US 2014/0368179 A1    Dec. 18, 2014

(30) Foreign Application Priority Data

Jun. 17, 2013  (KR) .......................... 10-2013-0069122

(51) Int. Cl.
*H02M 3/158* (2006.01)
*H02M 3/04* (2006.01)
(Continued)

(52) U.S. Cl.
CPC .............. *H02M 3/04* (2013.01); *H02J 9/005* (2013.01); *H02M 1/4208* (2013.01); *H02M 2001/0032* (2013.01); *Y02B 70/126* (2013.01); *Y02B 70/16* (2013.01)

(58) Field of Classification Search
CPC ...... H02M 1/42; H02M 1/4208; H02M 3/04; H02M 2001/0032; H02M 2001/0045; H02M 3/1584; H02J 9/005; H02J 1/00; H02J 3/00
USPC ...................... 323/268, 293, 304; 307/31, 82
See application file for complete search history.

(56) References Cited

U.S. PATENT DOCUMENTS 7,864,551 B2 * 1/2011 Chen ...................... G06F 1/263
                                              307/66
8,258,744 B2    9/2012 Ishii et al.
(Continued)

FOREIGN PATENT DOCUMENTS

CN    201222664    4/2009
CN    101909928    12/2010
(Continued)

OTHER PUBLICATIONS

Korean Office Action dated Jan. 27, 2015 in corresponding Korean Patent Application No. 10-2013-0069122.
(Continued)

*Primary Examiner* — Yemane Mehari
(74) *Attorney, Agent, or Firm* — Sughrue Mion, PLLC

(57) ABSTRACT

A power supply device may include: a standby power unit converting a direct current (DC) voltage to an operating voltage and a first standby voltage and providing the first standby voltage to a standby output terminal; a DC/DC converting unit receiving the operating voltage from the standby power unit, converting the DC voltage to a main voltage, and providing the main voltage to a main output terminal; and a main/standby power unit converting the main voltage from the DC/DC converting unit to a second standby voltage and providing the second standby voltage to the standby output terminal. The standby power unit varies a magnitude of the first standby voltage based on whether or not the second standby voltage is supplied to the standby output terminal.

4 Claims, 6 Drawing Sheets

(51) Int. Cl.
*H02J 9/00* (2006.01)
*H02M 1/42* (2007.01)
*H02M 1/00* (2006.01)

(56) References Cited

U.S. PATENT DOCUMENTS

| | | |
|---|---|---|
| 2010/0295507 A1 | 11/2010 | Ishii et al. |
| 2012/0043811 A1* | 2/2012 | Jeong .................. G06F 1/26 307/31 |
| 2012/0112722 A1* | 5/2012 | Sakda .................. H02J 1/102 323/293 |

FOREIGN PATENT DOCUMENTS

| | | |
|---|---|---|
| CN | 102377351 | 3/2012 |
| JP | 2001-298860 | 10/2001 |
| KR | 10-2009-0022222 | 3/2009 |
| KR | 20-2009-0003906 | 4/2009 |

OTHER PUBLICATIONS

Chinese Office Action dated Feb. 2, 2016 from corresponding Chinese Patent Application No. 201410270061.X, 24 pages.

* cited by examiner

POWER SUPPLY DEVICE FOR SUPPLYING STANDBY VOLTAGE BY USING MAIN VOLTAGE

CROSS-REFERENCE TO RELATED APPLICATION

This application claims the benefit of Korean Patent Application No. 10-2013-0069122 filed on Jun. 17, 2013, with the Korean Intellectual Property Office, the disclosure of which is incorporated herein by reference.

BACKGROUND

The present disclosure relates to a power supply device applicable to a server.

In general, an existing power supply for a server may use a flyback converter having a simple structure to generate standby power. The flyback converter may have low efficiency due to high voltage stress and hard switching.

A power supply device for a server according to the related art has a structure in which a standby power unit supplies operating power and standby power using direct current (DC) power from a power factor correction (PFC) unit, and a DC/DC converting unit receives the operating power from the standby power unit and supplies a main voltage using the DC power from the PFC unit.

However, in the power supply device for a server according to the related art, the standby power unit generally uses the flyback converter. In a state in which an input voltage of approximately 230 Vac is input to the power supply device under a load of 50%, efficiency of the PFC unit is approximately 98%, efficiency of the DC/DC converting unit is approximately 96%, and efficiency of the standby power unit is approximately 80%.

Therefore, despite a relatively low degree of importance of the standby power unit as compared to the DC/DC converting unit, the related art power supply device for a server has very low efficiency. Thus, efficiency of an overall system of the server to which the power supply device is applied may deteriorate.

SUMMARY

An aspect of the present disclosure may provide a power supply device capable of increasing system efficiency by supplying a standby voltage using a main voltage.

An aspect of the present disclosure may also provide a power supply device capable of increasing system efficiency by varying a magnitude of voltage provided to a standby output terminal from a standby power unit.

According to an aspect of the present disclosure, a power supply device may include: a standby power unit converting a direct current (DC) voltage to an operating voltage and a first standby voltage and providing the first standby voltage to a standby output terminal; a DC/DC converting unit receiving the operating voltage from the standby power unit, converting the DC voltage to a main voltage, and providing the main voltage to a main output terminal; and a main/standby power unit converting the main voltage from the DC/DC converting unit to a second standby voltage and providing the second standby voltage to the standby output terminal, wherein the standby power unit varies a magnitude of the first standby voltage based on whether or not the second standby voltage is supplied to the standby output terminal.

The standby power unit may vary the magnitude of the first standby voltage when the second standby voltage is supplied to the standby output terminal.

The standby power unit may decrease the magnitude of the first standby voltage to be lower than that of the second standby voltage.

The standby power unit may include: a passive element unit connected between an output terminal of the standby power unit and a ground; and a switching unit connected between the passive element unit and the ground.

The switching unit may be turned on when the second standby voltage is supplied to the standby output terminal.

The main/standby power unit may include a first diode having an anode connected to the main output terminal and a cathode connected to the standby output terminal, and the first diode may be turned on by the main voltage from the DC/DC converting unit and provide the second standby voltage to the standby output terminal.

The main/standby power unit may include: a voltage regulator converting the main voltage from the DC/DC converting unit to a regulated voltage; and a second diode having an anode connected to an output terminal of the voltage regulator and a cathode connected to the standby output terminal, and the second diode may be turned on by the main voltage from the DC/DC converting unit and provide the second standby voltage to the standby output terminal.

The power supply device may further include a protecting circuit unit connected between the output terminal of the standby power unit and the standby output terminal and turning off a power supply line connected to the output terminal of the standby power unit during supplying the second standby voltage.

The protecting circuit unit may include a protecting diode having an anode connected to the output terminal of the standby power unit and a cathode connected to the standby output terminal, and the protecting diode may be turned off during supplying the second standby voltage.

According to another aspect of the present disclosure, a power supply device may include: a standby power unit converting a DC voltage to an operating and a first standby voltage and providing the first standby voltage to a standby output terminal; a DC/DC converting unit receiving the operating voltage from the standby power unit, converting the DC voltage to a main voltage, and providing the main voltage to a main output terminal; a main/standby power unit converting the main voltage from the DC/DC converting unit to a second standby voltage and providing the second standby voltage to the standby output terminal; and a sensing unit sensing whether or not the second standby voltage is supplied to the standby output terminal, wherein the sensing unit outputs a switching signal varying a magnitude of the first standby voltage to the standby power unit when the second standby voltage is supplied to the standby output terminal.

The standby power unit may decrease the magnitude of the first standby voltage to be lower than that of the second standby voltage based on the switching signal.

The standby power unit may include: a passive element unit connected between an output terminal of the standby power unit and a ground; and a switching unit connected between the passive element unit and the ground.

The switching unit may be operated based on the switching signal.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION

Figure 1:
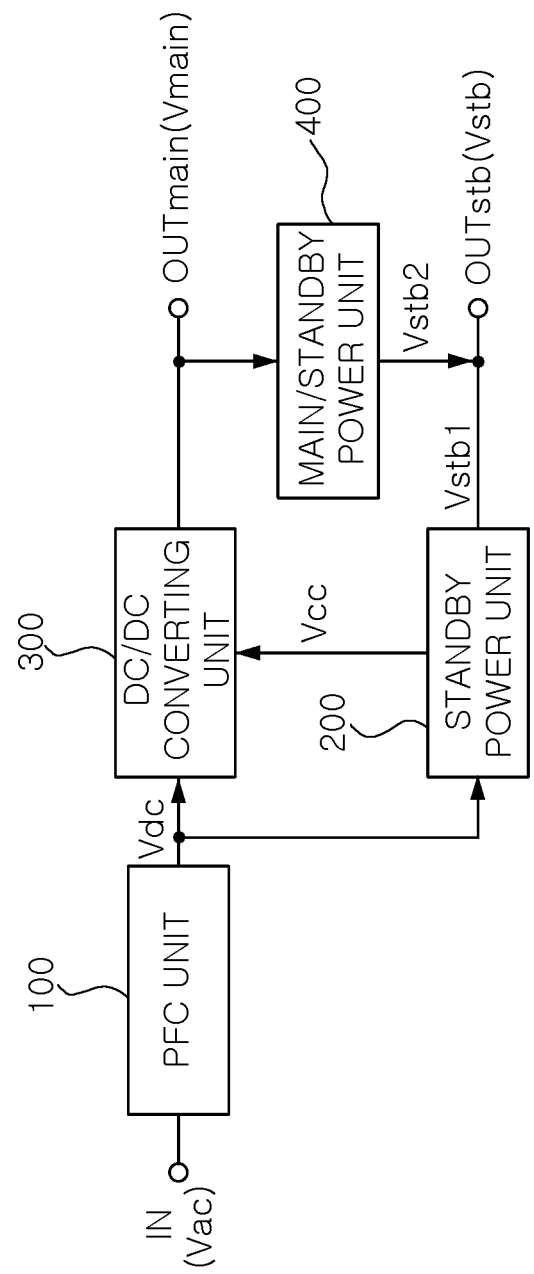
FIG. 1 is a block diagram illustrating a power supply device according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram illustrating a power supply device according to an exemplary embodiment of the present disclosure.

Referring to FIG. 1, the power supply device may include a power factor correction (PFC) unit 100, a standby power unit 200, a direct current (DC)/DC converting unit 300, and a main/standby power unit 400.

The PFC unit 100 may convert an alternating current (AC) voltage to a DC voltage Vdc having a preset magnitude and provide the DC voltage Vdc to the DC/DC converting unit 300 and the standby power unit 200.

The standby power unit 200 may convert the DC voltage Vdc provided from the PFC unit 100 to an operating voltage Vcc having a preset magnitude and a first standby voltage Vstb1, and provide the first standby voltage Vstb1 to a standby output terminal OUTstb.

The DC/DC converting unit 300 may receive the operating voltage Vcc from the standby power unit 200, convert the DC voltage Vdc to a main voltage Vmain having a preset magnitude, and provide the main voltage Vmain to a main output terminal.

The main/standby power unit 400 may convert the main voltage Vmain from the DC/DC converting unit 300 to a second standby voltage Vstb2 having a preset magnitude, and provide the second standby voltage to the standby output terminal OUTstb.

Meanwhile, according to the exemplary embodiment of the present disclosure, the standby power unit 200 may vary a magnitude of the first standby voltage Vstb1 based on whether or not the second standby voltage Vstb2 is supplied to the standby output terminal OUTstb. For example, in the case in which the second standby voltage Vstb2 is supplied to the standby output terminal OUTstb, the standby power unit 200 may vary the magnitude of the first standby voltage Vstb1. Specifically, the standby power unit 200 may decrease the magnitude of the first standby voltage Vstb1 to be lower than that of the second standby voltage Vstb2.

Figure 2:
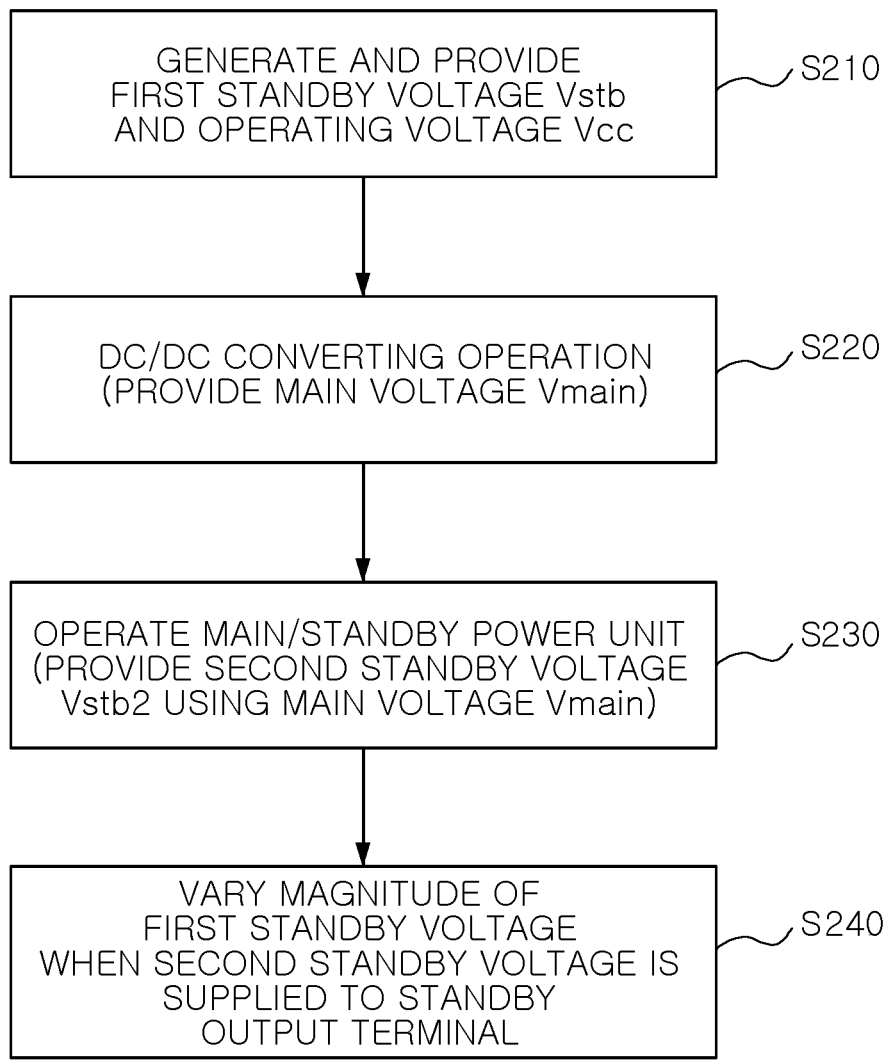
FIG. 2 is a flowchart illustrating a method of controlling a power supply device according to an exemplary embodiment of the present disclosure.

FIG. 2 is a flowchart illustrating a method of controlling a power supply device according to an exemplary embodiment of the present disclosure.

According to the exemplary embodiment of the present disclosure, the PFC unit 100 may convert an AC voltage having a predetermined magnitude (e.g., approximately 90 to 266 Vac) to a DC voltage having a preset magnitude (e.g., 380 Vdc) and provide the DC voltage Vdc to the DC/DC converting unit 300 and the standby power unit 200.

In addition, according to the exemplary embodiment of the present disclosure, the standby power unit 200 may convert the DC voltage Vdc from the PFC unit 100 to an operating voltage Vcc having a preset magnitude (e.g., 10 Vdc) and a first standby voltage Vstb1 (e.g., 10 Vdc), and provide the first standby voltage Vstb1 to the standby output terminal OUTstb (S210). Here, the first standby voltage Vstb1 may be a standby voltage Vstb.

In addition, according to the exemplary embodiment of the present disclosure, the DC/DC converting unit 300 may receive the operating voltage Vcc from the standby power unit 200, operate an internal circuit of the DC/DC converting unit 300, convert the DC voltage Vdc to a main voltage Vmain having a preset magnitude (e.g., 12 Vdc), and provide the main voltage Vmain (e.g., 12 Vdc) to the main output terminal OUTmain (S220).

In addition, according to the exemplary embodiment of the present disclosure, the main/standby power unit 400 may convert the main voltage Vmain from the DC/DC converting unit 300 to a second standby voltage Vstb2 having a preset magnitude (e.g., 10 V), and provide the second standby voltage Vstb2 to the standby output terminal OUTstb (S230). Here, the second standby voltage Vstb2 may be a standby voltage Vstb.

In addition, according to the exemplary embodiment of the present disclosure, in the case in which the second standby voltage is supplied to the standby output terminal OUTstb, the standby power unit 200 may vary the magnitude of the first standby voltage Vstb1 (S240). Specifically, the standby power unit 200 may decrease the magnitude of the first standby voltage Vstb1 to be lower than that of the second standby voltage Vstb2.

In this case, since the magnitude of the first standby voltage Vstb1 supplied to the standby output terminal OUTstb is reduced to be lower than that of the second standby voltage Vstb2, the second standby voltage Vstb2 may be applied to the standby output terminal OUTstb.

That is, in the case in which the DC/DC converting unit 300 is turned on, the standby power unit 200 varies the magnitude of the first standby voltage Vstb1, thereby preventing leakage of the first standby voltage Vstb1 from the standby power unit 200 into the standby output terminal OUTstb.

Meanwhile, in a standby state in which the DC/DC converting unit 300 is not operated, the standby power unit 200 adjusts the magnitude of the first standby voltage Vstb1 to maintain the preset magnitude, thereby providing the standby output terminal OUTstb with a voltage having a magnitude similar to that of the voltage to be supplied to the standby output terminal OUTstb when the DC/DC converting unit 300 is operated.

Therefore, the power supply device according to the exemplary embodiment of the present disclosure may decrease voltage variations in the standby output terminal OUTstb.

In addition, when the DC/DC converting unit 300 is operated, the first standby voltage of the standby power unit 200 is lowered, such that power supplied to internal circuits in the power supply device is lowered. As a result, efficiency of the power supply device may be increased.

Figure 3:
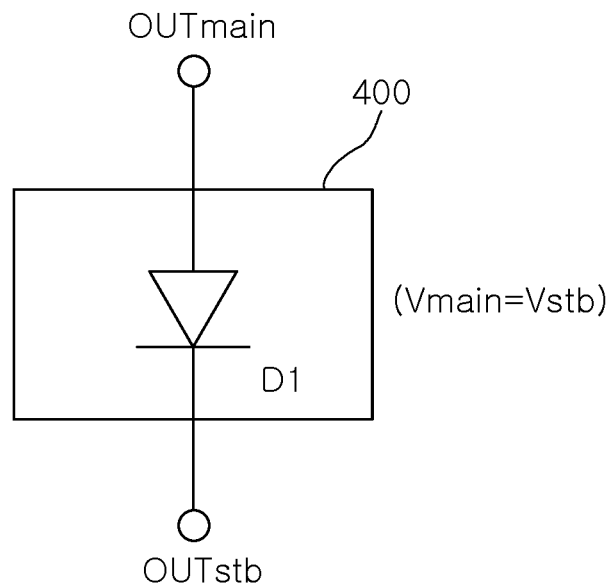
FIG. 3 is a view illustrating a first configuration example of a main/standby power unit according to an exemplary embodiment of the present disclosure.

FIG. 3 is a view illustrating a first configuration example of a main/standby power unit 400 according to an exemplary embodiment of the present disclosure.

Referring to FIG. 3, the main/standby power unit 400 may include a first diode D1 having an anode connected to the main output terminal OUTmain and a cathode connected to the standby output terminal OUTstb.

In this case, the first diode D1 may be configured to be turned on by the main voltage Vmain from the DC/DC converting unit 300 and provide the second standby voltage Vstb2 to the standby output terminal OUTstb.

Figure 4:
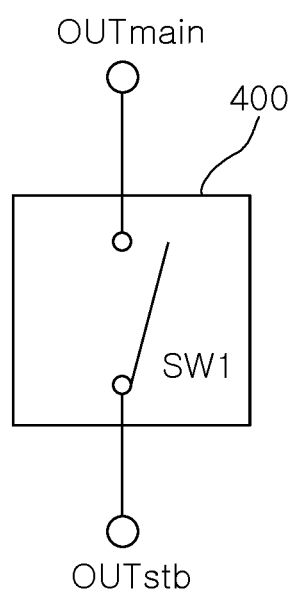
FIG. 4 is a view illustrating a second configuration example of a main/standby power unit according to an exemplary embodiment of the present disclosure.

FIG. 4 is a view illustrating a second configuration example of a main/standby power unit 400 according to an exemplary embodiment of the present disclosure.

Referring to FIG. 4, the main/standby power unit 400 may include a first switching element SW1 connected between the main output terminal OUTmain and the standby output terminal OUTstb.

In this case, the first switching element SW1 is configured to be turned on by a first switching control signal and provide the main voltage Vmain from the DC/DC converting unit 300 to the standby output terminal OUTstb.

For example, when the main voltage Vmain is supplied from the DC/DC converting unit 300, the power supply device may be configured to provide the first switching control signal, wherein the first switching element SW1 may be turned off by the first switching control signal.

Figure 5:
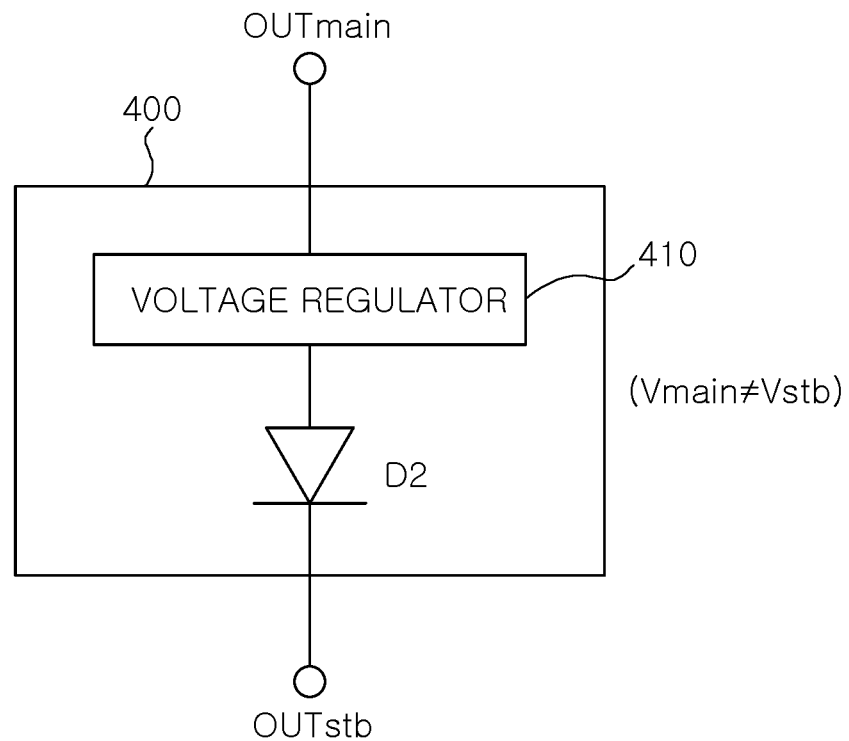
FIG. 5 is a view illustrating a third configuration example of a main/standby power unit according to an exemplary embodiment of the present disclosure.

FIG. 5 is a view illustrating a third configuration example of a main/standby power unit 400 according to an exemplary embodiment of the present disclosure.

Referring to FIG. 5, the main/standby power unit 400 may include a voltage regulator 410 converting the main voltage Vmain from the DC/DC converting unit 300 to a regulated voltage having a preset magnitude, and a second diode D2 having an anode connected to an output terminal of the voltage regulator 410 and a cathode connected to the standby output terminal OUTstb.

In this case, the second diode D2 may be configured to be turned on by a voltage from the voltage regulator 410 and provide the second standby voltage Vstb2 to the standby output terminal OUTstb.

Figure 6:
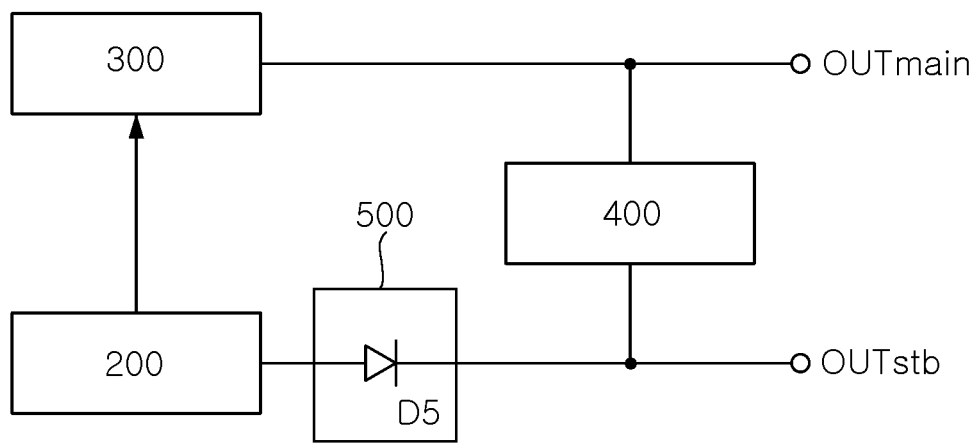
FIG. 6 is a view illustrating a modified configuration of a power supply device according to an exemplary embodiment of the present disclosure.

FIG. 6 is a view illustrating a modified configuration of a power supply device according to an exemplary embodiment of the present disclosure.

Referring to FIG. 6, the power supply device may include a protecting circuit unit 500 connected between an output terminal of the standby power unit 200 and the standby output terminal OUTstb and turning off a power supply line connected to the output terminal of the standby power unit 200 during supplying the second standby voltage Vstb2.

The protecting circuit unit 500 may include a protecting diode D5 having an anode connected to the output terminal of the standby power unit 200 and a cathode connected to the standby output terminal OUTstb.

In this case, the protecting diode D5 may be configured to be turned off during supplying the second standby voltage Vstb2.

That is, according to the exemplary embodiment of the present disclosure, in the case in which the DC/DC converting unit 300 is turned on, the standby power unit 200 decreases the magnitude of the first standby voltage, thereby preventing leakage of the first standby voltage from the standby power unit 200 into the standby output terminal OUTstb.

Specifically, the protecting circuit unit 500 may be connected between the output terminal of the standby power unit 200 and the standby output terminal OUTstb and turn off the power supply line connected to the output terminal of the standby power unit 200 during supplying the second standby voltage Vstb2. As a result, an introduction of the second standby voltage Vstb2 to the second standby power unit 200 may be blocked.

As an example, in the case in which the protecting circuit unit 500 includes the protecting diode D5, the protecting diode D5 may be turned off during supplying the second standby voltage Vstb2.

For example, in the case in which the first and second standby voltages Vstb1 and Vstb2 are 10 Vdc, respectively, the protecting diode D5 may be turned off.

Figure 7:
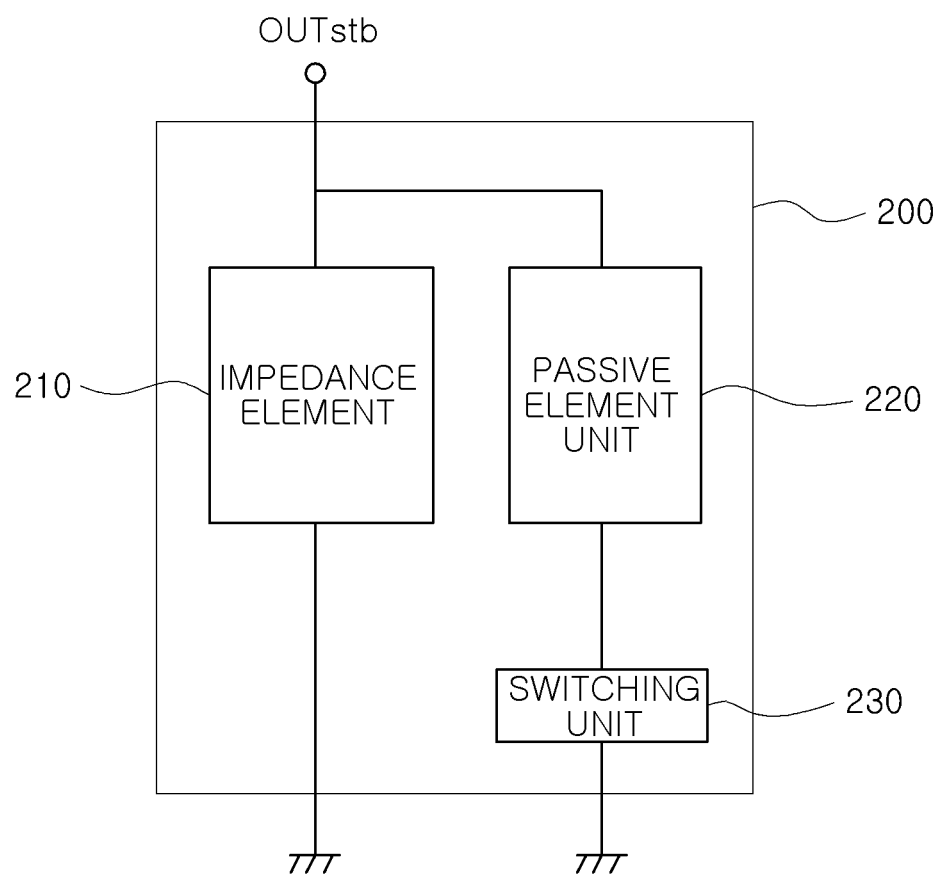
FIG. 7 is a view illustrating a standby power unit according to an exemplary embodiment of the present disclosure.

FIG. 7 is a view illustrating a standby power unit according to an exemplary embodiment of the present disclosure.

Referring to FIG. 7, the standby power unit 200 may include a predetermined impedance element 210.

According to the exemplary embodiment of the present disclosure, in the case in which the second standby voltage is provided to the standby output terminal OUTstb, the standby power unit 200 may vary a magnitude of the first standby voltage. Specifically, the standby power unit 200 may decrease the magnitude of the first standby voltage to be lower than that of the second standby voltage.

To this end, the standby power unit 200 may include a passive element unit 220 and a switching unit 230.

The passive element unit 220 may be connected between the output terminal OUTstb of the standby power unit and a ground. The passive element unit 220 may include at least one passive element.

In addition, the switching unit 230 may be connected between the passive element unit and the ground.

According to the exemplary embodiment of the present disclosure, the switching unit 230 may be turned on when the second standby voltage is supplied to the standby output terminal.

Therefore, the first standby voltage output to the standby output terminal OUTstb may be decreased.

Figure 8:
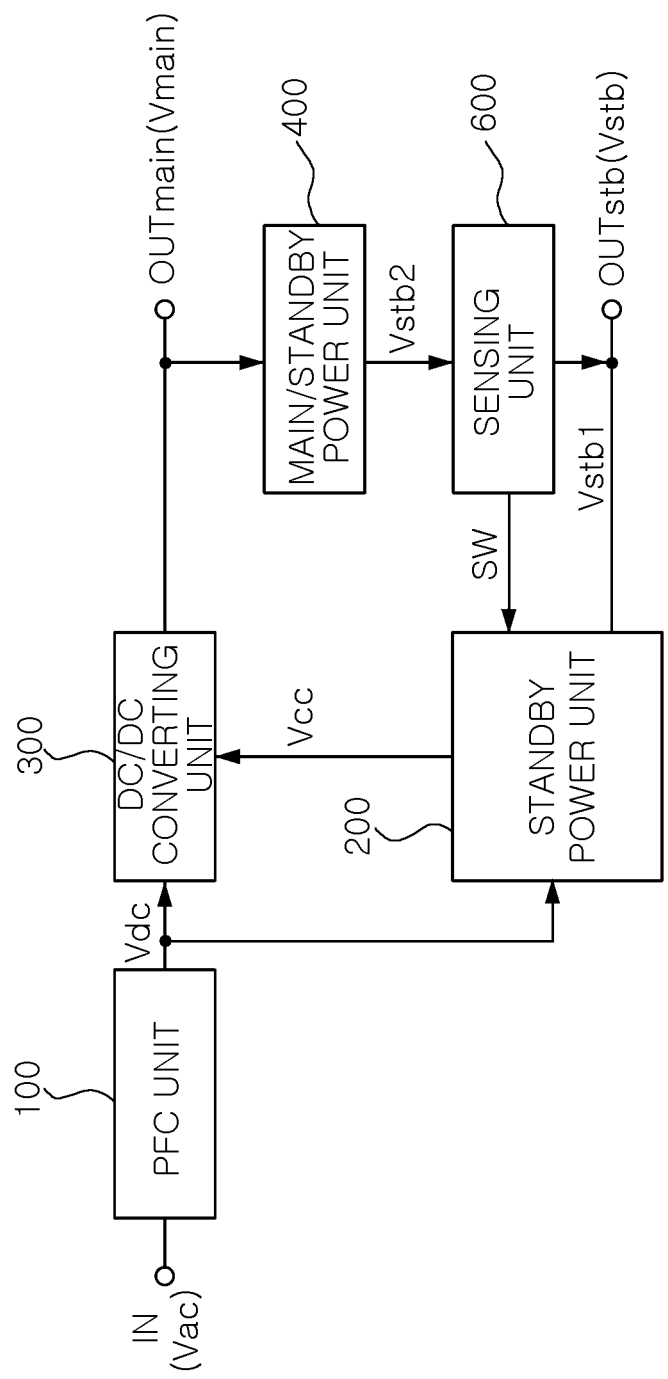
FIG. 8 is a block diagram illustrating a power supply device according to another exemplary embodiment of the present disclosure.

FIG. 8 is a block diagram illustrating a power supply device according to another exemplary embodiment of the present disclosure.

Referring to FIG. 8, the power supply device may include a PFC unit 100, a standby power unit 200, a DC/DC converting unit 300, a main/standby power unit 400, and a sensing unit 600.

Since the PFC unit 100, the standby power unit 200, the DC/DC converting unit 300, and the main/standby power unit 400 have been described above, a detailed description thereof will be omitted.

The sensing unit 600 may sense whether or not the second standby voltage Vstb2 is supplied to the standby output terminal OUTstb.

In addition, in the case in which the sensing unit 600 senses that the second standby voltage is supplied to the standby output terminal, the sensing unit 600 may generate a switching signal SW varying the first standby voltage and output the switching signal SW to the standby power unit 200.

Referring to FIGS. 7 and 8, the switching unit 230 may be operated based on the switching signal SW. That is, the switching signal SW may control the switching unit 230. For example, in the case in which the sensing unit 600 senses the second standby voltage, the switching unit 230 may be turned on.

In the scheme described above, in the case in which the second standby voltage is supplied to the standby output terminal OUTstb, the standby power unit 200 may decrease the magnitude of the first standby voltage.

By the configurations described above, the power supply device may vary the magnitude of the voltage provided from the standby power unit to the standby output terminal and supply the standby voltage using the main voltage, thereby increasing system efficiency.

As set forth above, according to exemplary embodiments of the present disclosure, the power supply device may be capable of increasing system efficiency by supplying the standby voltage using the main voltage.

In addition, according to exemplary embodiments of the present disclosure, the power supply device may be capable of increasing system efficiency by varying the magnitude of the voltage provided to the standby output terminal from the standby power unit.

While exemplary embodiments have been shown and described above, it will be apparent to those skilled in the art that modifications and variations could be made without departing from the spirit and scope of the present disclosure as defined by the appended claims.

What is claimed is:

1. A power supply device, comprising:
   a standby power unit converting a DC voltage to an operating voltage and a first standby voltage and providing the first standby voltage to a standby output terminal;
   a DC/DC converting unit receiving the operating voltage from the standby power unit, converting the DC voltage to a main voltage, and providing the main voltage to a main output terminal;
   a main/standby power unit converting the main voltage from the DC/DC converting unit to a second standby voltage and providing the second standby voltage to the standby output terminal; and
   a sensing unit sensing whether or not the second standby voltage is supplied to the standby output terminal,
   wherein the sensing unit outputs a switching signal varying a magnitude of the first standby voltage to the standby power unit when the second standby voltage is supplied to the standby output terminal.

2. The power supply device of claim 1, wherein the standby power unit decreases the magnitude of the first standby voltage to be lower than that of the second standby voltage based on the switching signal.

3. The power supply device of claim 2, wherein the standby power unit includes:
   a passive element unit connected between an output terminal of the standby power unit and a ground; and
   a switching unit connected between the passive element unit and the ground.

4. The power supply device of claim 3, wherein the switching unit is operated based on the switching signal.

* * * * *